United States Patent Office

3,642,930
Patented Feb. 15, 1972

3,642,930
PROCESS FOR THE MANUFACTURE OF ISOPRENE FROM ISOAMYLENES AND METHYL BUTANOLS AND CATALYST THEREFOR
Robert K. Grasselli, Garfield Heights, and Harley F. Hardman, Lyndhurst, Ohio, assignors to The Standard Oil Company, Cleveland, Ohio
No Drawing. Continuation-in-part of abandoned application Ser. No. 794,469, Dec. 30, 1968. This application Oct. 20, 1969, Ser. No. 867,934
Int. Cl. C07c 5/18, 1/24
U.S. Cl. 260—680 E
12 Claims

ABSTRACT OF THE DISCLOSURE

A vapor phase catalytic oxydehydrogenation process for the conversion of a stream of mixed isomeric isoamylenes, methyl butanols or mixtures thereof to isoprene with relatively short contact times at a reactor temperature in the range of 500° F. to 1100° F. at from 0.5 to about 10 atmospheres pressure. The catalysts comprise an alkali metal as an essential catalytic ingredient.

CROSS REFERENCE TO RELATED APPLICATIONS

This application is a continuation-in-part of our copending and now abandoned application Ser. No. 794,469 filed Dec. 30, 1968.

BACKGROUND OF THE INVENTION

The catalytic oxydehydrogenation of olefins for the production of butadiene and isoprene has been the subject of continued interest for many years. The prior art encompasses catalysts consisting of elements which appear to cover the entire spectrum of the Periodic Table. Particular oxydehydrogenation catalysts are disclosed in U.S. Pats. Nos. 2,991,321; 2,991,322; 3,067,272; 3,110,746; 3,119,111. An all-important requirement in the commercial production of any chemical by catalytic oxidation is that the catalyst exhibit not only high conversion but extremely high selectivity for long periods of time. The foregoing patents, drawn to oxydehydrogenation catalysts, are disclosed to be generally effective in several reactions. The instant catalyst on the other hand, is particularly and unexpectedly effective in the conversion of isoamylenes, methyl butanols, or diisoamylene to isoprene, despite the presence of an alkali metal as an essential ingredient, and a relatively high content of a Group VIII Fourth Period element.

This invention relates to oxydehydrogenation catalysts consisting essentially of an alkali metal as an essential catalytic ingredient in combination with oxides of bismuth, molybdenum and iron. The instant alkali metal containing catalyst is an improvement over prior art catalysts in that it is particularly suited to the catalytic oxydehydrogenation of isoamylenes, methyl butanols or mixtures thereof to isoprene.

It is noteworthy that, in general, a catalyst particularly effective in one oxydehydrogenation reaction is conspicuously unable to perform as well in another. For example, an oxydehydrogenation catalyst containing the oxides of bismuth, molybdenum, iron and nickel is disclosed in U.S. Pat. No. 3,414,631, and it is particularly efficient in the oxydehydrogenation of butene to butadiene but significantly less effective in the conversion of isoamylenes to isoprene. This peculiar and unexplained preference of a catalyst for one reaction over another apparently analogous one, is reflected and focused by the absence of examples disclosing analyses of the products of reaction in a number of prior art disclosures. In any event, there is significant utility of the instant invention in the catalytic oxidation of olefins to unsaturated aldehydes and acids, and for the catalytic ammoxidation of olefins to unsaturated nitriles.

DESCRIPTION OF PREFERRED EMBODIMENT OF INVENTION

The alkali metal oxide-bismuth oxide-molybdenum oxide-iron oxide base catalyst disclosed herein is referred to as a mixture of metal oxides, but this is not to be construed as meaning that the catalyst is composed either in whole or in part of only these compounds. The proportions of alkali metal, bismuth, molybdenum and the Group VIII Fourth Period element in the catalyst may vary within the ranges described hereinafter. Preferred alkali metals are potassium, cesium and rubidium. Preferred alkaline earth metals are magnesium, calcium, strontium and barium. Additionally, the instant catalyst may include promoters from Group V and particularly phosphorus, arsenic and antimony.

The unsupported catalyst of the instant invention gives excellent results. In a commercial reactor, for economic reasons, it might be desirable to use a catalyst support which may constitute from 3 percent to 99 percent, and preferably between 5 percent and 95 percent by weight of the finished catalyst. Any known catalyst support such as alumina, pumice, silicon carbide, zirconia, titania, silica, alumina-silica, and the inorganic phosphates, silicates, aluminates, borates and carbonates stable under the reaction conditions may be used.

In the preparation of the promoted catalysts useful in this invention, the metal oxides can be blended together or can be formed separately and then blended or formed separately or together in situ. Promoter oxides are preferably incorporated into the alkali metal-bismuth-molybdenum-iron base catalyst by blending into the gel before calcining or by blending into the oven-dried base catalyst before calcining. A preferred manner of incorporating promoter elements is by choosing a water-soluble salt of the promoter element, forming an aqueous solution of the salt, and mixing the solution with a solution or a suspension of the base elements or salts thereof. Optionally, the promoter elements may be incorporated by the use of soluble complex salts or compounds with the desired base elements which upon calcination will yield the desired ratio of the elements in the finished catalyst.

The alkali metal may be introduced into the catalyst as an oxide or as any salt which upon calcination will yield the oxide. Preferred salts are the nitrates which are readily available and easily soluble.

Bismuth may be introduced into the catalyst as an oxide or as any salt which upon calcination will yield the oxide. Most preferred are the water-soluble salts which are easily dispersible within the catalyst and which form stable oxides upon heat-treating. The most preferred salt for introducing bismuth is bismuth nitrate.

To introduce the iron component into the catalyst one may use any compound of iron which, upon calcination, will result in the oxides. As with the other elements, water-soluble salts are preferred for the ease with which they may be uniformly dispersed within the catalyst. Most preferred is ferric nitrate. Cobalt and nickel are similarly introduced.

To introduce the molybdenum component, any molybdenum oxide such as the dioxide, trioxide, pentoxide, or sesquioxide may be used; more preferred is a hydrolyzable or decomposable molybdenum salt such as a molybdenum halide. A preferred starting material is ammonium heptamolybdate.

The alkali or alkaline earth metals may be introduced into the catalyst in the form of water-soluble salts or insoluble carbonates, hydroxides and the like, which result in the oxides upon heat-treating. When phosphorus is desired in the catalyst it may be introduced as phosphoric acid, or as an alkali or alkaline earth phosphate, particularly if it is desired to neutralize the solution and at the same time introduce the desired elements as phosphates. Arsenic may be introduced as orthoarsenic acid, and antimony may be introduced as a slurry of hydrous antimony oxide formed in situ from the metal in nitric acid, or by the action of boiling nitric acid on antimony oxide. Other promoter elements may be introduced, starting with the metal, oxidizing the metal with an oxidizing acid such as nitric acid, and then incorporating the nitrate into the catalyst. Generally, the nitrates are readily available and form a very convenient starting material.

Other variations in starting materials will suggest themselves to one skilled in the art, particularly when the preferred starting materials mentioned hereinabove are unsuited to the economics of large-scale manufacture. In general, any compounds containing the desired catalyst components may be used provided that they result, upon heating to a temperature within the range disclosed hereinafter, in the oxides of the instant catalyst. Proper selection of the promoter elements and the proportions of the elements present in the catalyst will influence the selectivity of particular oxydehydrogenation reactions. Thus, in some cases one might use a relatively high amount of potassium and a lower amount of magnesium with a phosphorus promoter, while in other cases one might use a minor quantity of a cesium promoter with a relatively high amount of barium without any phosphorus.

The catalytic activity of the novel catalyst embodied in the present invention is enhanced by heating the catalyst at an elevated temperature. Preferably the catalyst mixture is dried and heated at a temperature of from 500° F. to 1250° F., more preferably at about 800° F. to 1150° F. for from 2 to 24 hours. If the activity-selectivity relationship is not satisfactory, the catalyst can be further heat-treated at a temperature above about 800° F. but below a temperature deleterious to the catalyst at which it is grossly decomposed, preferably in the range from about 800° F. to about 1400° F. for from 1 to 48 hours, in the presence of oxygen or an oxygen-containing gas such as air.

There appears to be no readily discernible correlation between activation temperature and the time required to effect activation. The sufficiency of activation at any given set of conditions is ascertained by a spot test of a sample of the material for catalytic activity. Activation is best carried out in an open chamber, permitting circulation of air or oxygen, so that any oxygen consumed will be replaced.

It has also been found that some of the instant catalysts can be further activated by subjecting heat-treated catalyst to a reducing atmosphere for a period of from about 1 hour to about 48 hours at a temperature in the range from about 400° F. to about 1250° F. This reducing treatment is conveniently accomplished by flowing a reducing gas such as ammonia, hydrogen or the like over the catalyst. It was found that catalysts treated with a reducing gas gave higher conversions to isoprene after some time, though during an initial short period of time, conversions were actually lower than those given by the same catalysts not subjected to the reducing treatment.

The instant catalyst comprising an alkali metal as an essential catalytic ingredient with the combined oxides of bismuth, molybdenum and iron may be defined by the following formula:

$$Bi_aFe_bMo_cQ_dR_eT_fM_gO_x$$

wherein

Q is an alkali metal,
R is an alkaline earth metal,
T is phosphorus, arsenic or antimony,
M is cobalt or nickel; and wherein $a$, $b$ and $c$ are numbers in the range 0.1 to 12,
$d$ is a number from 0.1 to 8,
$e$ is a number from 0 to 8,
$f$ is a number from 0 to 6,
$g$ is a number from 0 to 12,
$x$ is a number determined by the valence requirements of the other elements present.

The process of the instant invention is specifically concerned with the conversion of isoamylenes, methyl butanols or mixtures thereof to isoprene. This process involves passing a mixture of isoamylenes or any particular isomeric isoamylene, and a molecular oxygen-containing gas such as air, in the presence or absence of a diluent such as steam, carbon dioxide, nitrogen or other inert gas at relatively high temperatures over a catalyst of a composition described hereinabove.

It is a noteworthy feature of the instant process that a mixed stream of isomeric isoamylenes and methyl butanols, without regard to the molar balance of isomers and methyl butanols, may be fed to the reactor with substantially the same results in conversion. In all of the example appended hereto, the more easily converted 3-methyl butene-1 was deliberately excluded from the feed, which consisted of a mixture of 2-methyl butene-1 and 2-methyl butene-2. The alcohol utilized in the examples was t-amyl alcohol although 2-methyl butanol-3, 3-methyl butanol-1, and 2-methyl butanol-1 can also be converted.

The above-described catalysts are active at temperatures in the range from about 500° F. to about 1000° F., and a preferred range for operation is between 650° F. and 900° F. In this temperature range the catalysts exhibit exceptional activity and selectivity.

The pressure at which the instant process is usually conducted is about atmospheric, although pressures of from slightly below atmospheric up to and above 3 atmospheres are operable.

The apparent contact time employed in the instant process may be within the range of 0.01 to 20 seconds, and for good selectivity and yields a contact time of from 0.1 to 10 seconds is preferred.

Molar ratios of isoamylenes to air may vary from about 1:1 to about 1:20. Ratios near the higher limit usually make for poor selectivity, and ratios near the lower limit tend to decrease catalyst activity. The preferred molar ratio of isoamylenes to air is in the range of about 1:1 to 1:10. It may be advantageous to include gases such as steam, carbon dioxide or nitrogen in addition to the nitrogen contained in the air fed to the reactor. However, for economic reasons it is usually not desirable to add more than 10 volumes of diluent gas for each volume of isoamylene in the feed.

The reactor employed for the conversion of isoamylenes, methyl butanols or mixtures thereof to isoprene in the instant invention may be a fixed-bed reactor, or a fluid-bed reactor. Changes in the physical characteristics of the catalyst described above, particularly to suit either the fluid-bed or the fixed-bed reactor, may be made according to known methods familiar to those skilled in the art. The particular reactor employed in the instant process for the examples appended hereto was a standard reactor with a fixed catalyst bed. The catalyst volume was about 20 cc., and the catalyst mesh size was 20–35 Tyler screen mesh. The gases were metered to the reactor with rotameters. The reaction products were analyzed by means of a gas chromatograph. The column employed was a one-fourth (¼) inch diameter by 4 meter column packed with 20 percent orthonitrophenetole on Chromosorb W for hydrocarbons. Carbon dioxide and carbon monoxide were determined by means of a Fisher gas partitioner, using hexamethyl phosporamide and molecular sieve columns in series. Isoamylenes, methyl butanols and isoprene were analyzed by passing the reactor effluent gases over a solid drying agent and then into a gas sampling valve which was opened periodically for gas chromatographic analysis.

Example 1

A specific catalyst was made as follows: 36.4 grams bismuth nitrate, $Bi(NO_3)_3 \cdot 5H_2O$, were dissolved in 700 ml. dilute nitric acid taken in a large beaker. 7.6 grams potassium nitrate, $KNO_3$, 120 grams cobaltous nitrate, $Co(NO_3)_2 \cdot 6H_2O$, and 182 grams ferric nitrate, $$Fe(NO_3)_3 \cdot 9H_2O$$

were all added to the solution and also dissolved. 8.65 grams phosphoric acid (85 percent) were added to the solution while it was continuously stirred. 159 grams ammonium molybdate, $(NH_4)_6Mo_7O_{24} \cdot 4H_2O$, were dissolved in a small quantity of water and slowly added to the foregoing acidic solution. Precipitation was instantaneous. The solution was constantly stirred and heated over a hot plate until the entire mass gelled. The gel was spooned out into trays and dried in a conventional convection oven at 130° C. for 16 hours. The dried mass was then calcined in air at 800° F. for 16 hours. A final heat-treatment in air at 1000° F. for 3 hours was given the catalyst prior to loading into the reactor.

Other catalyst compositions were prepared in a similar manner using, for convenience, water-soluble salts of the elements desired in the final composition, though as has been disclosed hereinbefore, the use of water-soluble salts is not essential.

In Table I appended hereto, various catalysts, prepared in a manner similar to that described in Example 1 above, are effective in the manufacture of isoprene under the tabulated process conditions. All runs in Table I were made in a fixed-bed reactor at 750° F. with a feed consisting of a mixture of 2-methyl butene-1 and 2-methyl butene-2 diluted with nitrogen, and the molar ratio of air:isoamylenes:nitrogen was about 4:1:4. Particular physical characteristics such as surface area, density, particle size, and the like may be obtained by a judicious choice of proportions of catalyst elements, the ratio of catalyst to catalyst support, and the manner in which catalyst is preliminarily calcined prior to its final heat treatment, all of which characteristics may be modified to suit the particular reactor and predetermined conditions of reaction in accordance with known skills, and none of which physical characteristics is specifically tabulated herein.

The appended Table II lists various promoted catalysts with and without a catalyst support under varying temperature of reaction, contact time, and air:nitrogen ratios.

The appended Table III is a comparison of a prior art catalyst and that of the instant invention. It will be noted that the latter contains an alkali metal as an essential catalytic ingredient.

The appended Table IV lists runs utilizing the instant catalyst on some preferred supports.

In the appended Table V, two runs are shown utilizing a catalyst consisting of 60 percent $Fe_9Bi_3PMo_{12}O_x \cdot K_2SO_4$ and 40 percent $TiO_2$, wherein $x$ is a number taken to satisfy the oxygen requirements of the elements in the catalyst. The reactor was a fixed bed, and the contact time was 4 seconds. In one case a t-amyl alcohol feed was used, while in the other an equimolor mixture of t-amyl alcohol and 2-methyl butene-2 was used.

In all of the examples tabulated in the tables hereinbelow, small quantities of by-products are formed which are not specifically identified (or quantified in the tables) and have been disregarded in the calculations. These by-products may be oxidation products such as the aldehydes and acids and are usually present as relatively high molecular weight condensation products with an oily appearance.

In the examples listed hereinbelow, the following definitions are employed:

Total percent conversion-carbon basis

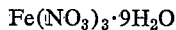

$$= \frac{\text{Weight of carbon in the products of reaction}}{\text{Weight of carbon in the isoamylenes in the feed}} \times 100$$

Percent conversion to isoprene $$= \frac{\text{Moles of isoprene in the products of reaction}}{\text{Moles of isoamylenes in the feed}} \times 100$$

From the foregoing description of the manner in which the experimental runs were made, it will be apparent that there were no provisions for many process steps which would be engineered into a commercial unit. For example, in a commercial reactor, the effluent would preferably be cooled by indirect heat exchange with the incoming feed and then scrubbed with water or dilute caustic to neutralize traces of organic acids present, to inhibit the formation of oily polymeric by-products, and to condense and remove steam. If air is used to supply the oxygen, the remaining mixture is preferably compressed and scrubbed with oil to separate the hydrocarbons from the nitrogen, carbon dioxide and carbon monoxide. The hydrocarbon may be stripped from the oil and subjected to an extractive distillation or a copper ammonium acetate treatment in the known manner to separate and recover the diolefin. Unreacted isoamylenes would be recycled to the reactor from the recovery section, and it is not essential that the recycle stream be pure isoamylenes. It can contain carbon dioxide, carbon monoxide, nitrogen and steam since these gases would serve only as diluents.

In the claims below, the term "consisting essentially of" is meant to include the main elements, namely, alkali metal, bismuth, molybdenum and iron, and the specified promoters where applicable, but is not meant to exclude small amounts of other elements, the presence of which may be incident to the quality, origin or particular processing of raw materials used to manufacture the instant catalyst. It will be apparent to thse skilled in the catalytic oxidation art that embodiments of the invention, other than those specifically described for illustrative purposes, may be evolved and that modifications in these specific embodiments may be made without departing from the spirit and scope of the invention as expressed above and as defined in the appended claims.

TABLE I

| Example | Catalyst | Contact time, secs. | Percent per pass conversion to Isoprene | CO₂ | CO | Total percent conversion | Selectivity, percent |
|---|---|---|---|---|---|---|---|
| 1 | KFe₉BiMo₁₂Co₀.₅Oₓ | 3.2 | 50.2 | 6.26 | 1.30 | 57.7 | 87.0 |
| 2 | K₀.₂₅Fe₉Bi₃PMo₁₂Oₓ | 3.8 | 33.8 | 5.53 | 1.03 | 43.0 | 78.6 |
| 3 | KFe₉Bi₃PMo₁₂Oₓ | 3.8 | 44.6 | 6.33 | 1.04 | 53.4 | 83.5 |
| 4 | K₂Fe₉Bi₃PMo₁₂Oₓ | 3.5 | 50.7 | 6.73 | 1.40 | 60.7 | 83.4 |
| 5 | K₃Fe₉Bi₃PMo₁₂Oₓ | 3.7 | 47.5 | 6.42 | 0.92 | 57.5 | 82.7 |
| 6 | K₄.₅Fe₉Bi₃PMo₁₂Oₓ | 3.8 | 33.0 | 7.77 | 1.12 | 41.8 | 78.9 |
| 7 | K₆Fe₉Bi₃PMo₁₂Oₓ | 3.7 | 18.5 | 5.13 | 0.61 | 24.7 | 74.8 |
| 8 | RbFe₉Bi₃PMo₁₂Oₓ | 3.7 | 53.6 | 3.95 | 0.90 | 61.5 | 87.2 |
| 9 | Li₀.₁Fe₉Bi₃PMo₁₂Oₓ | 3.9 | 36.0 | 7.38 | 1.32 | 45.5 | 79.1 |
| 10 | Li₂Fe₉Bi₃PMo₁₂Oₓ | 3.8 | 34.5 | 7.08 | 1.30 | 42.8 | 80.5 |
| 11 | K₃Fe₉Bi₂PMo₁₂Oₓ | 3.6 | 51.1 | 5.78 | 0.85 | 59.9 | 85.3 |
| 12 | CsFe₉Bi₃PMo₁₂Oₓ | 3.6 | 52.4 | 5.17 | 0.82 | 61.5 | 85.2 |
| 13 | CsFe₉Bi₃PMo₁₂Oₓ | 3.5 | 60.4 | 5.95 | 1.00 | 71.5 | 84.4 |
| 14 | K₂Fe₉BiPMo₁₂Oₓ | 3.4 | 53.2 | 7.28 | 1.29 | 61.8 | 86.2 |
| 15 | K₄Fe₉Bi₃P₂Mo₁₂Oₓ | 3.6 | 43.7 | 6.98 | 1.09 | 53.1 | 82.4 |
| 16 | K₂Fe₉Bi₃PMo₁₂Oₓ | 0.2 | 54.1 | 6.7 | 1.5 | 57.7 | 87.0 |
| 17 | NaFe₉Bi₃PMo₁₂Oₓ | 2.5 | 32.9 | 6.2 | 1.3 | 40.4 | 81.5 |
| 18 | K₀.₁Fe₂Bi₀.₅Sb₀.₅Mo₈Oₓ | .5 | 49.8 | 5.7 | 1.4 | 56.9 | 88.0 |

TABLE II

| Example | Catalyst | Temp., °F. | Air/N₂* mole ratio | Contact time, secs. | Percent conversion to— Isoprene | CO | CO₂ | Total conversion | Percent selectivity |
|---|---|---|---|---|---|---|---|---|---|
| 19 | 82.5%KCo₀Ni₀.₅Fe₀.₅Bi₀.₅AsMo₁₂Oₓ·17.5% SiO₂ support | 700 | 6/2.5 | 4 | 6.0 | 0.3 | 1.8 | 8.1 | 74 |
|   |   | 750 | 6/2.6 | 4 | 24.3 | 1.7 | 9.0 | 32.0 | 76 |
|   |   | 800 | 6/2.6 | 4 | 35.2 | 1.8 | 12.0 | 49.0 | 71.9 |
| 20 | 82.5%KNi₁₀.₅FeBi₀.₅Sb₀.₅Mo₁₂Oₓ·17.5% SiO₂ support | 650 | 6/2.6 | 4 | 7.5 | 1.8 | 8.0 | 17.3 | 43.4 |
|   |   | 700 | 6/2.5 | 4 | 32.3 | 3.0 | 11.8 | 47.1 | 68.5 |
|   |   | 750 | 6/2.6 | 4 | 36.4 | 2.8 | 11.8 | 51.0 | 71.3 |
| 21 | 100%KNi₁₀.₅FeBi₀.₅Sb₀.₅Mo₁₂Oₓ | 700 | 6.2/3.7 | 1 | 15.2 | 1.1 | 5.4 | 21.7 | 70.0 |
|   |   | 750 | 6.3/3.8 | 1 | 31.7 | 2.0 | 10.4 | 44.1 | 71.9 |
|   |   | 800 | 6.6/3.9 | 1 | 33.2 | 1.8 | 12.6 | 47.6 | 69.7 |
| 22 | 80%KCo₀.₅Fe₆BiPMo₁₂Oₓ·20% Al₂O₃ support | 700 | 5.4/3.2 | 1 | 9.6 | 0.8 | 3.4 | 13.8 | 69.6 |
|   |   | 750 | 5.6/3.4 | 1 | 31.7 | 3.6 | 8.3 | 43.6 | 72.6 |

*Per mole isoamylene.

TABLE III

| Example | Catalyst | Molar ratio, air/N₂ [1] | Temp. (°F.) | Contact time (secs.) | Percent per pass conversion to— Isoprene | CO₂ | CO | Total conversion | Percent selectivity |
|---|---|---|---|---|---|---|---|---|---|
| 23 | Bi₂FeMo₄.₅Oₓ [2] | 4.02/3.8 | 750 | 2 | 25.9 | 8.73 | 1.38 | 36.01 | 72.0 |
| 24 | K₀.₃₇₅Bi₂Fe₁Mo₄.₅Oₓ | 4/4 | 750 | 2 | 50.0 | 6.24 | 1.03 | 59.90 | 83.4 |
| 25 | Bi₀.₅Fe₁Mo₁.₃₄Oₓ [2] | 4/4 | 750 | 2 | 28.2 | 8.57 | 1.40 | 38.70 | 72.8 |
| 26 | K₀.₁Bi₀.₅Fe₁Mo₁.₃₄Oₓ | 4/4 | 750 | 2 | 54.5 | 5.42 | 1.00 | 64.00 | 85.1 |

[1] Per mole isoamylenes.

TABLE IV

| Example | Catalyst and support | Molar ratio, air/N₂ [1] | Temp. (°F.) | Contact time (secs.) | Percent per pass conversion to— Isoprene | CO₂ | CO | Total Conversion | Percent selectivity |
|---|---|---|---|---|---|---|---|---|---|
| 27 | 65% KFe₉Bi₃PMo₁₂Oₓ·35% Illinois mineral (1160) [2] | 4/4 | 750 | 4 | 46.4 | 6.7 | 1.3 | 56.2 | 82.5 |
| 28 | 80% KFe₉Bi₃PMo₁₂Oₓ·20% pumice | 4/4 | 750 | 4 | 49.6 | 7.0 | 1.3 | 60.0 | 82.7 |
| 29 | 80% KFe₉Bi₃PMo₁₂Oₓ·20% Aluminum phosphate | 4/4 | 750 | 4 | 41.8 | 6.2 | 1.3 | 54.0 | 77.4 |
| 30 | 20% KFe₉Bi₃PMo₁₂Oₓ·80% Alundum | 4/4 | 750 | 4 | 36.2 | 8.8 | 0.7 | 44.8 | 79.5 |

[1] Per mole isoamylenes.  [2] 99% amorphous silica.

TABLE V

| Feed | Example 31 t-Amyl alcohol | Example 32 1/1 (molar) t-amyl alcohol/ 2-methyl butene-2 |
|---|---|---|
| Air/feed mole ratio | 3.87 | 3.74 |
| Products, percent carbon basis: |  |  |
| 2-methyl butene-1 | 14.4 | 16.6 |
| 2-methyl butene-2 | 40.3 | 45.9 |
| Isoprene | 41.4 | 31.2 |
| CO₂ | 5.3 | 5.5 |
| CO | 0.9 | 0.8 |
| Conversion, carbon basis | 45.3 | 37.6 |
| Selectivity | 91.4 | 83.1 |
| t-Amyl alcohol conversion, percent | 100 | 100 |

Note.—Contact time: 4 seconds. Catalyst: 60% Fe₉Bi₃PMo₁₂Oₓ·K₂SO and 40% TiO₂.

We claim:
1. The process for the conversion of isoamylenes, methyl butanols or mixtures thereof to isoprene comprising contacting said isoamylenes, methyl butanols or mixtures thereof with a molecular oxygen-containing gas over a catalyst consisting essentially of an activated catalytic oxide complex described by the following formula:

$$Bi_aFe_bMo_cQ_dR_eT_fM_gO_x$$

wherein
Q is an alkali metal,
R is an alkaline earth metal,
T is phosphorus, arsenic or antimony,
M is cobalt and/or nickel, and
wherein
$a$, $b$ and $c$ are numbers in the range 0.1 to 12, $d$ is a number from 0.1 to 8,
$e$ is a number from 0 to 8,
$f$ is a number from 0 to 6,
$g$ is a number from 0 to 12, and
$x$ is a number determined by the valence requirements of the other elements present, in a reaction zone maintained at from about 500° F. to about 1100° F. at from about 0.5 to about 10 atmospheres pressure with a contact time of from about 0.01 second to 50 seconds, and recovering the isoprene.

2. The process of claim 1 wherein said molecular oxygen-containing gas is air.

3. The process of claim 2 wherein the molar ratio of isoamylenes, methyl butanols or mixtures thereof to air is from 1:0.5 to 1:30.

4. The process of claim 1 wherein nitrogen is included in the feed stream to said reaction zone.

5. The process of claim 1 wherein said catalyst is supported on a catalyst support.

6. A catalyst composition consisting essentially of an activated catalytic oxide complex of an alkali metal, bismuth, iron and molybdenum as essential catalytic ingredients, and defined by the following formula:

$$Bi_a Fe_b Mo_c Q_d R_e T_f M_g O_x$$

wherein
Q is an alkali metal,
R is an alkaline earth metal,
T is phosphorus, arsenic or antimony,
M is cobalt or nickel, and wherein
$a$, $b$ and $c$ are numbers in the range 0.1 to 12,
$d$ is a number from 0.1 to 8,
$e$ is a number from 0 to 8,
$f$ is a number from 0 to 6,
$g$ is a number from 0 to 12, and
$x$ is a number determined by the valence requirements of the other elements present.

7. The composition of claim 6 wherein Q is potassium.

8. The catalyst composition of claim 7 containing phosphorus.

9. The composition of claim 8 containing cobalt.

10. The composition of claim 8 containing nickel.

11. The composition of claim 6 supported on a catalyst support present in a range from 5 percent to 95 percent by weight of the supported catalyst.

12. The composition of claim 7 containing cobalt and nickel.

References Cited
UNITED STATES PATENTS

| | | | |
|---|---|---|---|
| 3,110,746 | 11/1963 | Voge et al. | 260—680 |
| 3,119,111 | 1/1964 | McDonald et al. | 260—680 |
| 3,171,859 | 3/1965 | Sennewald et al. | 260—604 |
| 3,414,631 | 12/1968 | Grasselli et al. | 260—680 |

PAUL M. COUGHLAN, Jr., Primary Examiner

U.S. Cl. X.R.

252—456, 464, 470; 260—465.3, 533 N, 604 R, 681, 682